US010771937B2

(12) United States Patent
Kuraoka

(10) Patent No.: US 10,771,937 B2
(45) Date of Patent: Sep. 8, 2020

(54) EMERGENCY NOTIFICATION APPARATUS

(71) Applicant: DENSO CORPORATION, Kariya, Aichi-pref. (JP)

(72) Inventor: Hiroaki Kuraoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/419,543

(22) Filed: May 22, 2019

(65) Prior Publication Data

US 2019/0274016 A1    Sep. 5, 2019

Related U.S. Application Data

(63) Continuation of application No. PCT/JP2017/042493, filed on Nov. 28, 2017.

(30) Foreign Application Priority Data

Dec. 21, 2016  (JP) .................. 2016-248150

(51) Int. Cl.
*H04W 4/40*       (2018.01)
*G01C 21/30*      (2006.01)
*G08B 25/10*      (2006.01)
*H04M 11/04*      (2006.01)
*G08B 25/08*      (2006.01)
(Continued)

(52) U.S. Cl.
CPC .............. *H04W 4/40* (2018.02); *G01C 21/28* (2013.01); *G01C 21/30* (2013.01); *G08B 21/00* (2013.01); *G08B 25/08* (2013.01); *G08B 25/10* (2013.01); *H04M 11/04* (2013.01)

(58) Field of Classification Search
CPC ......... H04W 4/40; G01C 21/28; G01C 21/30; G08B 21/00; G08B 25/08; G08B 25/10; H04M 11/04
USPC ........................................ 340/435
See application file for complete search history.

(56) References Cited

U.S. PATENT DOCUMENTS 5,392,052 A * 2/1995 Eberwine .............. G01S 5/0009
342/357.55
5,504,482 A * 4/1996 Schreder ................ G01C 21/26
340/988

(Continued)

FOREIGN PATENT DOCUMENTS

JP      H10049776 A    2/1998
JP      2010175323 A   8/2010

*Primary Examiner* — Ojiako K Nwugo
(74) *Attorney, Agent, or Firm* — Harness, Dickey & Pierce, P.L.C.

(57) ABSTRACT

An emergency notification apparatus includes: a position detector that sequentially detects a position of a subject vehicle; a notification portion that issues an emergency notification; a map information acquisition portion that acquires map information around the subject vehicle; and a correction portion that sequentially corrects the position of the subject vehicle by sequentially performing map matching. The notification portion issues the emergency notification that includes the position of the subject vehicle corrected by the correction portion in a case where the state of emergency of the subject vehicle has been caused in the subject vehicle, and also in a case where the correction portion sequentially corrects the position of the subject vehicle.

10 Claims, 5 Drawing Sheets

(51) Int. Cl.
*G08B 21/00* (2006.01)
*G01C 21/28* (2006.01)

(56) References Cited

U.S. PATENT DOCUMENTS

| | | | | |
|---|---|---|---|---|
| 8,594,616 | B2* | 11/2013 | Gusikhin | H04W 4/90 |
| | | | | 455/404.1 |
| 2002/0169545 | A1* | 11/2002 | Toyooka | G01S 19/42 |
| | | | | 701/469 |
| 2002/0186150 | A1* | 12/2002 | Sweetapple | G01S 19/21 |
| | | | | 340/988 |
| 2005/0149251 | A1* | 7/2005 | Donath | G01C 21/26 |
| | | | | 701/532 |
| 2012/0249343 | A1* | 10/2012 | Thomas | G08G 1/096716 |
| | | | | 340/905 |
| 2013/0311086 | A1* | 11/2013 | Aoki | G01C 21/30 |
| | | | | 701/446 |
| 2014/0031003 | A1* | 1/2014 | Shugart | H04W 4/90 |
| | | | | 455/404.2 |
| 2014/0172293 | A1* | 6/2014 | Chang | G01C 21/005 |
| | | | | 701/446 |
| 2015/0094901 | A1* | 4/2015 | Brenneis | B60W 50/029 |
| | | | | 701/29.1 |
| 2016/0146616 | A1* | 5/2016 | Ren | G01C 21/30 |
| | | | | 701/409 |
| 2016/0280401 | A1* | 9/2016 | Driscoll | B64G 1/1014 |
| 2016/0282473 | A1* | 9/2016 | Driscoll | G01S 19/49 |
| 2017/0158118 | A1* | 6/2017 | Lenker | B60Q 1/52 |
| 2017/0227574 | A1* | 8/2017 | Theytaz | G01C 22/006 |
| 2018/0025632 | A1* | 1/2018 | Breed | G01C 21/32 |
| | | | | 701/93 |

* cited by examiner

US 10,771,937 B2

EMERGENCY NOTIFICATION APPARATUS

CROSS REFERENCE TO RELATED APPLICATIONS

The present application is a continuation application of International Patent Application No. PCT/JP2017/042493 filed on Nov. 28, 2017, which designated the United States and claims the benefit of priority from Japanese Patent Application No. 2016-248150 filed on Dec. 21, 2016. The entire disclosures of all of the above applications are incorporated herein by reference.

TECHNICAL FIELD

The present disclosure relates to an emergency notification apparatus which issues an emergency notification in case of a state of emergency caused in a vehicle.

BACKGROUND

An emergency notification apparatus which issues an emergency notification in case of a state of emergency caused in a vehicle is conventionally known.

SUMMARY

The present disclosure provides an emergency notification apparatus that is configured to: detect a position of a subject vehicle; issue an emergency notification; acquire map information around the subject vehicle from an outside of the subject vehicle; and correct the position of the subject vehicle by sequentially performing map matching between a road indicated by the map information and the position of the subject vehicle. The notification portion issues the emergency notification that includes the position of the subject vehicle corrected by the correction portion.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

Figure 1:
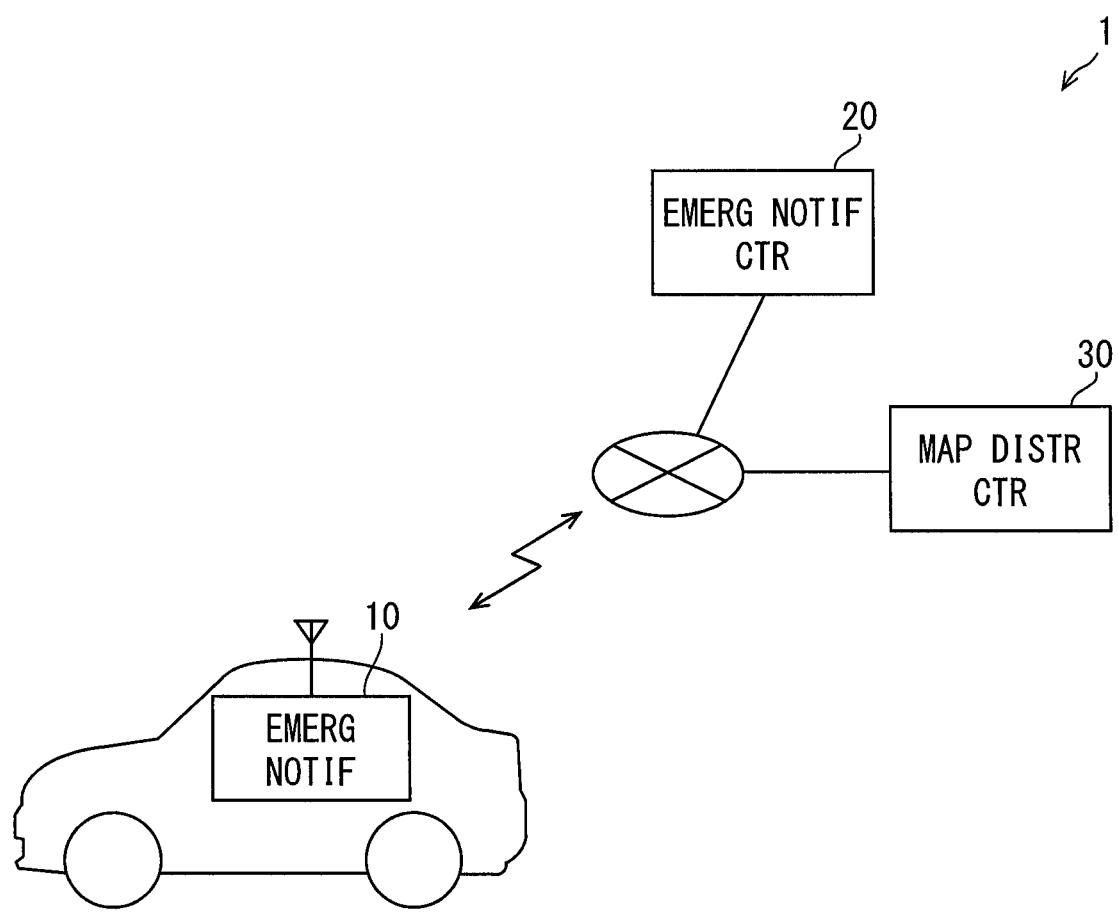
FIG. 1 is a diagram showing an example of a schematic configuration of an emergency notification system.

As an emergency notification apparatus, for example, it has been known that a technology notifies a notification destination of emergency information including position information, such as a position of a subject vehicle detected by a device dedicated to a system for detecting the position of the subject vehicle, based on data for subject vehicle position detection contained in a navigation device, or a global positioning system (GPS) method when a state of emergency of the subject vehicle is determined. The technology may allow a notification destination to quickly respond to the state of emergency by notifying the notification destination of the information indicating the position of the subject vehicle.

The inventor of the present application has found that, according to the technology, detection accuracy of the subject vehicle position detected by the device using the GPS method may deteriorate in an environment where reception of signals from positioning satellites is difficult, such as a tunnel. Accordingly, when a state of emergency is caused in such an environment where reception of signals from positioning satellites is difficult, accurate information about the position of the subject vehicle may be difficult to transmit to the notification destination. In this case, quick response to the state of emergency may be difficult to achieve by the notification destination.

Accuracy of detection of the position of the subject vehicle by the navigation device may be maintained by map matching which uses map information and the position of the subject vehicle detected by inertial navigation, even in the environment where reception of signals from positioning satellites is difficult. Detection by the navigation device may not be applicable to a vehicle not including the navigation device. For a vehicle not including the navigation device, map information may be considered to be stored in advance in a memory of a vehicle emergency system to maintain accuracy of the position of the subject vehicle by map matching. This method may require an additional memory having a large capacity and being expensive. Alternatively, map information limited to surroundings of the position of the subject vehicle may be sequentially acquired by sequentially accessing map information stored in a server device, for example. This method may increase a communication volume, and may raise communication cost.

The present disclosure provides an emergency notification apparatus capable of issuing more accurate information about a position of a subject vehicle to a notification destination at the time of emergency notification, even in a vehicle not including a navigation system, while eliminating the necessity of retaining a large volume of map information and reducing a communication volume.

According to one aspect of the present disclosure, an emergency notification apparatus used in a vehicle is provided. The emergency notification apparatus includes: a position detector that sequentially detects a position of a subject vehicle, wherein the position detector is configured to detect the position of the subject vehicle based on a positioning signal received from a positioning satellite and detect the position of the subject vehicle by inertial navigation; a notification portion that issues an emergency notification when a state of emergency is caused in the subject vehicle; a map information acquisition portion that acquires map information around the subject vehicle from an outside of the subject vehicle based on a state that a total number of positioning satellites whose positioning signal is capable of being received is smaller than a specified value; and a correction portion that sequentially corrects the position of the subject vehicle by sequentially performing map matching between a road indicated by the map information acquired by the map information acquisition portion and the position of the subject vehicle detected by the inertial navigation based on the state that the number of positioning satellites whose positioning signal is capable of being received is smaller than the specified value. The notification portion issues the emergency notification that includes the position of the subject vehicle corrected by the correction portion in a case where the state of emergency of the subject vehicle has been caused in the subject vehicle, and also in a case where the correction portion sequentially corrects the position of the subject vehicle.

According to this configuration, map matching between the road indicated by the map information acquired by the map information acquisition portion and the position of the subject vehicle detected by the inertial navigation to sequentially correct the position of the subject vehicle based on the state that the number of positioning satellites whose positioning signal can be received is smaller than the specified value. Accordingly, even in an environment where reception of signals from positioning satellites is difficult, high accuracy of the position of the subject vehicle can be maintained. In the case where a state of emergency has been caused in the subject vehicle, and in the case where the correction portion sequentially corrects the position of the subject vehicle, an emergency notification including the position of the subject vehicle corrected by the correction portion is issued. Accordingly, more accurate information indicating the position of the subject vehicle can be issued to the notification destination at the time of emergency notification. Moreover, map information used for map matching is acquired from the outside of the subject vehicle. Accordingly, even a vehicle not incorporating a navigation device can issue more accurate information indicating the position of the subject vehicle to the notification destination at the time of emergency notification.

Furthermore, the map information used for map matching is not acquired sequentially, but based on the state that the number of positioning satellites whose positioning signal can be received is smaller than the specific value. Accordingly, reduction of a communication volume is achievable. In addition, map information used for map matching is map information around the subject vehicle. Accordingly, a large volume of map information is not required to be retained unlike a case where map information indicating areas in addition to the area around the subject vehicle is acquired. Accordingly, even a vehicle not including a navigation device can issue more accurate information indicating the position of the subject vehicle to the notification destination at the time of emergency notification while eliminating the necessity of retaining a large volume of map information, and reducing the communication volume.

Multiple embodiments for disclosure will be described with reference to the drawings. For convenience of explanation, parts having functions identical to functions of parts shown in figures previously referred to for description among the multiple embodiments are given identical reference numbers. Description of these parts may be omitted in some cases. Description of other embodiments may be referred to for parts given identical reference numbers.

First Embodiment (Schematic Configuration of Emergency Notification System 1) The present embodiment will be described with reference to the drawings. As shown in FIG. 1, an emergency notification system 1 includes an emergency notification apparatus 10 used in a vehicle, an emergency notification center 20, and a map distribution center 30. A vehicle using the emergency notification apparatus 10 is referred to as a subject vehicle.

The emergency notification apparatus 10 is apparatus which issues an emergency notification to an emergency notification center 20 corresponding to a notification destination in case of a state of emergency, such as a collision accident of the subject vehicle, a stop caused by failure of the subject vehicle or running energy shortage, and a poor physical condition of a driver of the subject vehicle. The emergency notification apparatus 10 may be a communication module used for a telematics service such as a telematics control unit (TCU), or may include a communication module such as a TCU constituting a part of the emergency notification apparatus 10. Details of the emergency notification apparatus 10 will be described.

An emergency notification center 20 includes a server device, for example, and receives an emergency notification from the emergency notification apparatus 10 via a base station and a public communication network to handle the emergency notification. Examples of the public communication network include a cellular phone network, the Internet, and the like. Examples of the emergency notification center 20 include an operation center of a known emergency notification service, which is one of telematics services.

The map distribution center 30 is constituted by a server device, for example, and stores map information such as link data, node data, and road shapes. The map distribution center 30 also distributes map information in response to a request from the emergency notification apparatus 10 via the base station and the public communication network. Specifically, the map distribution center 30 distributes map information around the vehicle using the emergency notification apparatus 10 based on the vehicle position transmitted from the emergency notification apparatus 10. The area around the vehicle herein may be a range limited to a periphery of the vehicle, such as a range within a radius of 1 km, or a radius of 10 km.

(Schematic Configuration of Emergency Notification Apparatus 10)

Figure 2:
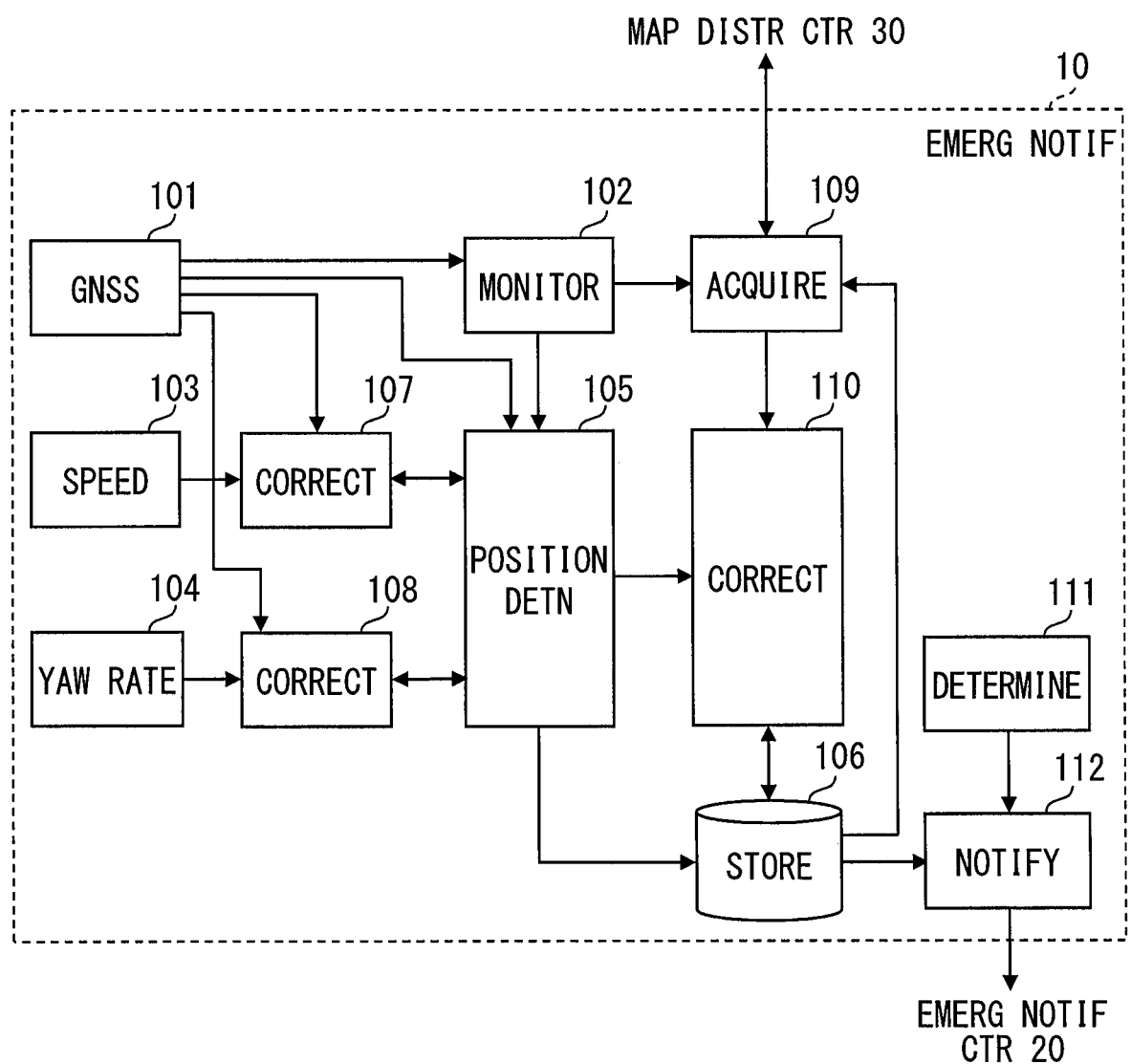
FIG. 2 is a diagram showing an example of a schematic configuration of an emergency notification apparatus.

Next, a schematic configuration of the emergency notification apparatus 10 will be described with reference to FIG. 2. As illustrated in FIG. 2, the emergency notification apparatus 10 includes a global navigation satellite system (GNSS) receiver 101, a satellite positioning monitor 102, a speed acquisition portion 103, a yaw rate acquisition portion 104, a position detector 105, a position storage 106, a speed correction portion 107, a yaw rate correction portion 108, a map information acquisition portion 109, a correction portion 110, a condition determination portion 111, and a notification portion 112. The satellite positioning monitor 102 corresponds to an example of a deterioration specifying portion of the present disclosure.

The GNSS receiver 101 receives a positioning signal periodically transmitted from a positioning satellite via a positioning signal receiving antenna. The positioning satellite is a positioning satellite included in a satellite positioning system such as GPS, quasi-zenith satellite system (QZSS), global navigation satellite system (GLONASS), Galileo, Indian regional navigational satellite system (IRNSS), Beidou and the like. In the present embodiment, a case where a positioning satellite is a GPS positioning satellite is described by way of example.

The GNSS receiver 101 determines a code pseudo range, a carrier wave phase, a Doppler shift of a carrier wave, a ratio of carrier wave to noise (referred to as C/N), and the like necessary for positioning calculation based on the positioning signal received from the positioning satellite. The GNSS receiver 101 also calculates latitude and longitude by performing calculations based on the determined code pseudo range, carrier wave phase, Doppler shift, C/N, and the like, and observation data such as orbital information included in the positioning signal, and periodically outputs the calculated latitude and longitude to the position detector 105, the speed correction portion 107, and the yaw rate correction portion 108. The GNSS receiver 101 may be configured to output observation data indicating all positioning satellites allowed to be received during an output period.

The satellite positioning monitor 102 monitors reception of positioning signals by the GNSS receiver 101, and determines a loss of positioning satellites. For example, a loss of positioning satellites may be determined when the number of the positioning satellites whose positioning signal can be received is a value smaller than a specified value. A loss of positioning satellites herein corresponds to a state that detection of the position of the subject vehicle based on positioning signals is difficult in the disclosure. The specified value may be three, for example, or may be four. The number of positioning satellites whose positioning signal can be received may be the number of positioning satellites whose positioning signal has been received within an output period.

Moreover, the satellite positioning monitor 102 sequentially specifies deterioration of detection accuracy of the vehicle position based on positioning signals (that is, by using satellite positioning system). Accordingly, the satellite positioning monitor 102 corresponds to a deterioration specifying portion in the disclosures. For example, dilution of precision (DOP), which is a positioning accuracy deterioration coefficient affected by a geometrical arrangement of a positioning satellite $G_n$ viewed from a reception point of positioning signals, may be sequentially specified as the foregoing deterioration. Positioning accuracy tends to increase as the value of DOP decreases. Accordingly, deterioration of positioning accuracy is considered to increase as the value of DOP increases. The DOP may be specified based on orbit information included in positioning signals received by the GNSS receiver 101. The DOP may adopt a configuration of Position DOP (PDOP), Horizontal DOP (HDOP), or Vertical DOP (VDOP). In the present embodiment, a case adopting HDOP is described by way of example.

The speed acquisition portion 103 acquires a value related to a speed of the subject vehicle. For example, it is assumed in the following description that a rotation speed of rolling wheels of the subject vehicle is sequentially acquired, which is sequentially detected by a wheel speed sensor provided on the subject vehicle. The speed acquisition portion 103 may be configured to directly acquire pulse signals from the wheel speed sensor, indirectly acquire pulse signals via an electronic control unit (ECU), or indirectly acquire pulse signals from other ECUs by using bus communication such as an in-vehicle local area network (LAN).

The yaw rate acquisition portion 104 acquires a value related to a yaw angle of the subject vehicle. For example, it is assumed in the following description that a rotational angular speed around a vertical axis of the subject vehicle (i.e., yaw rate), which speed is sequentially detected by a gyro sensor provided on the subject vehicle, is sequentially acquired. The yaw rate acquisition portion 104 may be configured to directly acquire a yaw rate from the gyro sensor, indirectly acquire a yaw rate via an ECU, or indirectly acquire a yaw rate from other ECUs via a bus communication such as an in-vehicle LAN.

When the DOP specified by the satellite positioning monitor 102 is lower than a first threshold (referred to as Th1), the position detector 105 sequentially detects the vehicle position of the subject vehicle based on observation data sequentially output from the GNSS receiver 101, and stores the detected vehicle position in the position storage 106. In other words, the vehicle position detected by satellite positioning is stored in the position storage 106. For example, the first threshold Th1 referred to herein may be any value as long as detection accuracy by the satellite positioning system generally becomes high. For example, the first threshold Th1 may be set to 1.0. The detection of the vehicle position by the position detector 105 based on the observation data may be performed in a manner similar to positioning by a known satellite positioning system.

The position storage 106 is a memory which temporarily stores the vehicle position of the subject vehicle, and may be constituted by a volatile memory, for example. It is assumed that the position storage 106 stores a set of vehicle positions indicated by multiple consecutive points (i.e., traveling locus) by sequentially storing the vehicle position sequentially detected by the position detecting portion 105. For example, in storing a new vehicle position, the position detector 105 deletes the oldest vehicle position to store, in the position storage 106, a traveling locus, which is constituted by a set of vehicle positions indicating multiple latest consecutive points.

When the DOP specified by the satellite positioning monitor 102 is equal to or higher than the first threshold Th1, the position detector 105 starts detecting the vehicle position of the subject vehicle by using inertial navigation. The inertial navigation is also referred to as dead reckoning. Details of detection of the vehicle position by inertial navigation in the present embodiment will be described. The position detector 105 starts detecting the vehicle position by inertial navigation before determining a loss of positioning satellites by using the satellite positioning monitor 102. The position detector 105 continues detection of the vehicle position by inertial navigation until the DOP specified by the satellite positioning monitoring portion 102 becomes a value equal to or higher than the first threshold Th1, and then returns to a value lower than the first threshold Th1. When the DOP returns to a value lower than the first threshold Th1, detection of the vehicle position by inertial navigation is ended, and detection of the vehicle position by satellite positioning is restarted.

The speed correction portion 107 sequentially corrects and calculates the speed of the subject vehicle from the rotation speed of the rolling wheels of the subject vehicle acquired by the speed acquisition portion 103. A deviation is produced between the rotation speed of the rolling wheels and the speed of the subject vehicle as a result of a change in a tire radius caused by a tire air pressure, a load of an occupant, attachment of a spare tire, and the like. Accordingly, the speed correction portion 107 performs correction for reducing this deviation and calculates the speed of the subject vehicle.

For example, when the satellite positioning monitor 102 does not determine a loss of positioning satellites, the speed correction portion 107 sequentially learns a tire radius correction coefficient, which is a correction coefficient for reducing the foregoing deviation caused by the change in the tire radius, based on positioning signals received from the positioning satellites. Subsequently, the speed correction portion 107 calculates a current speed of the subject vehicle by multiplying the learned tire radius correction coefficient by the rotation speed of the rolling wheels of the subject vehicle acquired by the speed acquisition portion 103. This calculation is performed by a formula expressed as: speed=(rotation speed of rolling wheel×tire radius correction coefficient).

Learning of the tire radius correction coefficient may be performed in a following manner, for example. Initially, a movement distance for n seconds is calculated from the vehicle position of the subject vehicle for n seconds as a position sequentially detected by the position detector 105 based on positioning signals received from positioning satellites. Also, an integral of the rotation speed of the rolling wheels for n seconds is calculated from the rotation speed of the rolling wheels of the subject vehicle acquired by the speed acquisition portion 103. Then, a value obtained by dividing the movement distance for n seconds by the integral of the rotation speed of the drive wheels for n seconds is learned as the tire radius correction coefficient. This calculation is performed by a formula expressed as: tire radius correction coefficient=(movement distance for n seconds calculated based on positioning signal/integral of rotation speed of rolling wheels for n seconds).

The speed correction portion 107 sequentially learns the tire radius correction coefficient based on positioning signals received from the positioning satellites, and performs correction using the learned tire radius correction coefficient to sequentially calculate the speed of the subject vehicle until the satellite positioning monitor 102 determines a loss of positioning satellites. On the other hand, when the satellite positioning monitor 102 determines a loss of positioning satellites, the speed correction portion 107 stops learning the tire radius correction coefficient, and performs correction by using the tire radius correction coefficient which has been obtained by the latest learning to sequentially calculate the subsequent speed of the subject vehicle until returning from the loss of positioning satellites.

The yaw rate correction portion 108 sequentially corrects and calculates a yaw angle of the subject vehicle based on a yaw rate of the subject vehicle acquired by the yaw rate acquisition portion 104. The yaw rate contains deviation caused by a tire air pressure, an unbalanced load of the occupant, an installation tolerance of the yaw rate sensor, and the like. In this case, an offset corresponding to this deviation is also contained in a change amount of the yaw angle calculated from the yaw rate. Accordingly, the yaw rate correction portion 108 corrects and calculates the yaw angle of the subject vehicle in such a manner as to eliminate this offset.

For example, when the satellite positioning monitor 102 does not determine a loss of positioning satellites, the yaw rate correction portion 108 sequentially learns the foregoing offset based on positioning signals received from positioning satellites. Then, the yaw rate correction portion 108 subtracts the learned offset from a change amount of the yaw angle obtained by integrating yaw rates of the subject vehicle acquired by the yaw rate acquisition portion 104 in a unit time (e.g., 1 second), multiplies the value obtained by the subtraction by the unit time, and adds the value obtained by the multiplication to a yaw angle previously calculated to calculate the current yaw angle of the subject vehicle. This calculation is performed by a formula expressed as: current yaw angle=previous yaw angle+(change amount of yaw angle per unit time calculated from yaw rate−offset)×unit time.

For example, learning the offset may be performed in a following manner. Initially, a change amount of an azimuth angle for n seconds is calculated from an azimuth angle of the subject vehicle, which is sequentially calculated based on positioning signals received from positioning satellites. Calculation of the azimuth angle of the subject vehicle based on positioning signals may be performed by a known method. For example, the azimuth angle of the subject vehicle may be calculated by vector combination of north speed and east speed of the subject vehicle calculated from a Doppler shift of the carrier wave. Also, an integral of the yaw rates of the subject vehicle acquired by the yaw rate acquisition portion 104 for n seconds is calculated. Then, a value obtained by subtracting the integral of the yaw rates for n seconds from the change amount of the azimuth angle for n seconds is multiplied by a unit time, and the value obtained by the multiplication is learned as the offset. This calculation is performed by a formula expressed as: offset= (change amount of azimuth angle for n seconds calculated from positioning signals−integral of yaw rates for n seconds)×unit time.

The yaw rate correction portion 108 may be configured to sequentially learn the offset based on positioning signals received from positioning satellites, and perform correction using the learned offset to sequentially calculate the yaw angle of the subject vehicle until the satellite positioning monitor 102 determines a loss of positioning satellites. When the satellite positioning monitor 102 determines a loss of positioning satellites, the yaw rate correction portion 108 may be configured to stop learning the offset, and perform correction by using the offset which has been learned by the latest learning to sequentially calculate the subsequent yaw angle of the subject vehicle until returning from the loss of positioning satellites.

Learning by the speed correction portion 107 and the yaw rate correction portion 108 may be configured to start before the DOP becomes the first threshold Th1 or higher, and may be configured to stop when the DOP becomes lower than the first threshold Th1. According to this configuration, the tire radius correction coefficient and the offset are learned only when positioning signals having preferable detection accuracy are acquired from positioning satellites. Accordingly, high accuracy of the detection of the vehicle position by inertial navigation can be maintained.

For detecting the vehicle position of the subject vehicle by inertial navigation, the position detector 105 detects the vehicle position based on the speed of the subject vehicle sequentially calculated by the speed correction portion 107, and the yaw angle of the subject vehicle sequentially calculated by the yaw rate correction portion 108. For example, this detection may be performed in a following manner. It is assumed in the following description that X is given as a latitude coordinate, Y as a longitude coordinate, and F as a change amount of the vehicle position of the subject vehicle calculated from the speed and yaw angle of the subject vehicle.

A current vehicle position is calculated by adding a change amount of the vehicle position of the subject vehicle calculated from the speed and yaw angle of the subject vehicle to a previous vehicle position. This calculation is performed by a formula expressed as: current vehicle position=previous vehicle position+F. More specifically, a latitude coordinate (referred to as $X_n$) of the current vehicle position is calculated by adding a change amount of the vehicle position of the subject vehicle in a latitude direction calculated from the speed and yaw angle of the subject vehicle to a latitude coordinate ($X_{n-1}$) of the previous vehicle position. The change amount in the latitude direction may be calculated by multiplying the speed of the subject vehicle by cos (yaw angle). This calculation is performed by a formula expressed as: $X_n = X_{n-1} + (\text{speed} \times \cos(\text{yaw angle}))$. A longitude coordinate (referred to as $Y_n$) of the current vehicle position is calculated by adding a change amount of the vehicle position of the subject vehicle in a longitude direction calculated from the speed and yaw angle of the subject vehicle to a longitude coordinate ($Y_{n-1}$) of a previous vehicle position. The change amount in the longitude direction may be calculated by multiplying the speed of the subject vehicle by sin (yaw angle). This calculation is performed by a formula expressed as: $Y_n=Y_{n-1}+$(speed×sin (yaw angle)).

After determining a loss of positioning satellites by the satellite positioning monitor 102, the position detector 105 stores the vehicle position detected by inertial navigation in the position storage 106. It is assumed that the position detector 105 detects the vehicle position by inertial navigation but stores the vehicle positions detected by satellite positioning in the position storage 106 until the satellite positioning monitor 102 determines a loss of positioning satellites. When the satellite positioning monitor 102 no longer determines a loss of positioning satellites after determining a loss of positioning satellites, the position detector 105 stores the vehicle position detected by inertial navigation in the position storage 106 until the DOP becomes lower than the first threshold Th1.

The map information acquisition portion 109 requests the map distribution center 30 to provide map information around the subject vehicle via the base station and the communication network, and acquires the map information around the subject vehicle distributed from the map distribution center 30. Even when the subject vehicle is located inside a tunnel, the map information acquisition portion 109 can acquire the map information from the map distribution center 30 by the presence of a repeater base station or the like, for example. The map information acquisition portion 109 may be configured to receive distribution of the map information around the vehicle position from the map distribution center 30 by transmitting a latest vehicle position of the subject vehicle stored in the position storage 106 to the map distribution center 30.

More specifically, the map information acquisition portion 109 acquires map information around the subject vehicle from the map distribution center 30 in a case where the satellite positioning monitor 102 determines a loss of positioning satellites, and in a case where the DOP specified by the satellite positioning monitor 102 is kept equal to or higher than the first threshold (referred to as Th2) for a first predetermined time or longer. The map information acquisition portion 109 may be configured to acquire map information around the subject vehicle when the satellite positioning monitor 102 determines a loss of positioning satellites. It may be preferable to add, to the condition for acquisition of the map information, a state that the DOP specified by the satellite positioning monitor 102 is kept lower than the second threshold Th2 for the first predetermined time or longer.

The condition may be preferably added to eliminate a waste of labor for acquiring map information even when a return from a loss of positioning satellites is possible within a short time after instantaneous determination of the loss. Examples of a situation in which a loss of positioning satellites is instantaneously determined include such a situation in which reception of positioning signals temporarily becomes difficult during traveling in a high-rise building street having many multipaths. The second threshold Th2 may be any value as long as whether or not reception of positioning signals is difficult can be determined based on the value. The second threshold Th2 may be a value identical to the first threshold Th1. The first predetermined time may be any period as long as distinction between a situation that reception of positioning signals temporarily becomes difficult, and a situation that reception of positioning signals becomes difficult for a relatively long period, such as travelling in a tunnel, can be made within the period.

The map information acquisition portion 109 may be configured to store acquired map information in a volatile memory, or store the map information in a nonvolatile memory. When map information stored in the memory is present, the map information acquisition portion 109 may preferably overwrite acquired new map information on the stored map information to save a memory capacity.

When map information around the subject vehicle is acquired by the map information acquisition portion 109, the correction portion 110 starts map matching between a link of the acquired map information and a set of vehicle positions indicated by multiple consecutive points of the subject vehicle stored in the position storage 106 (i.e., traveling locus) to correct these vehicle positions. That is, vehicle positions of the subject vehicle indicated by multiple consecutive points tracing back to a past are corrected by map matching. The correction portion 110 may be configured to correct, by map matching, vehicle positions of the subject vehicle indicated by multiple consecutive points tracing back to the past before the start of the map matching.

According to the Example of the present embodiment presented by way of example, the correction portion 110 starts map matching in a case where the satellite positioning monitor 102 determines a loss of positioning satellites, and in a case where the DOP specified by the satellite positioning monitor 102 is kept equal to or higher than the second threshold Th2 for the first predetermined time or longer. Accordingly, map matching is performed at least for vehicle positions detected by inertial navigation.

In addition, vehicle positions stored in the position storage 106 are sequentially updated. In this case, the correction portion 110 sequentially performs map matching to sequentially correct the vehicle positions stored in the position storage 106. When a vehicle position of the subject vehicle detected by satellite positioning is included in the vehicle positions stored in the position storage 106 in a situation that a period from determination of a loss of positioning satellites is short, the correction portion 110 also corrects, by map matching, this vehicle position of the subject vehicle detected by satellite positioning.

Map matching is performed by comparing a shape of a link indicating a road with a traveling locus, and correcting the vehicle position to a position on the link (i.e., on the road) similarly to known map matching. In addition, for correction of the vehicle position by map matching, it may be preferable to decide the vehicle position by calculating an average of vehicle positions at specific times calculated from vehicle positions at respective times in map matching sequentially performed for improvement of accuracy.

Figure 3:
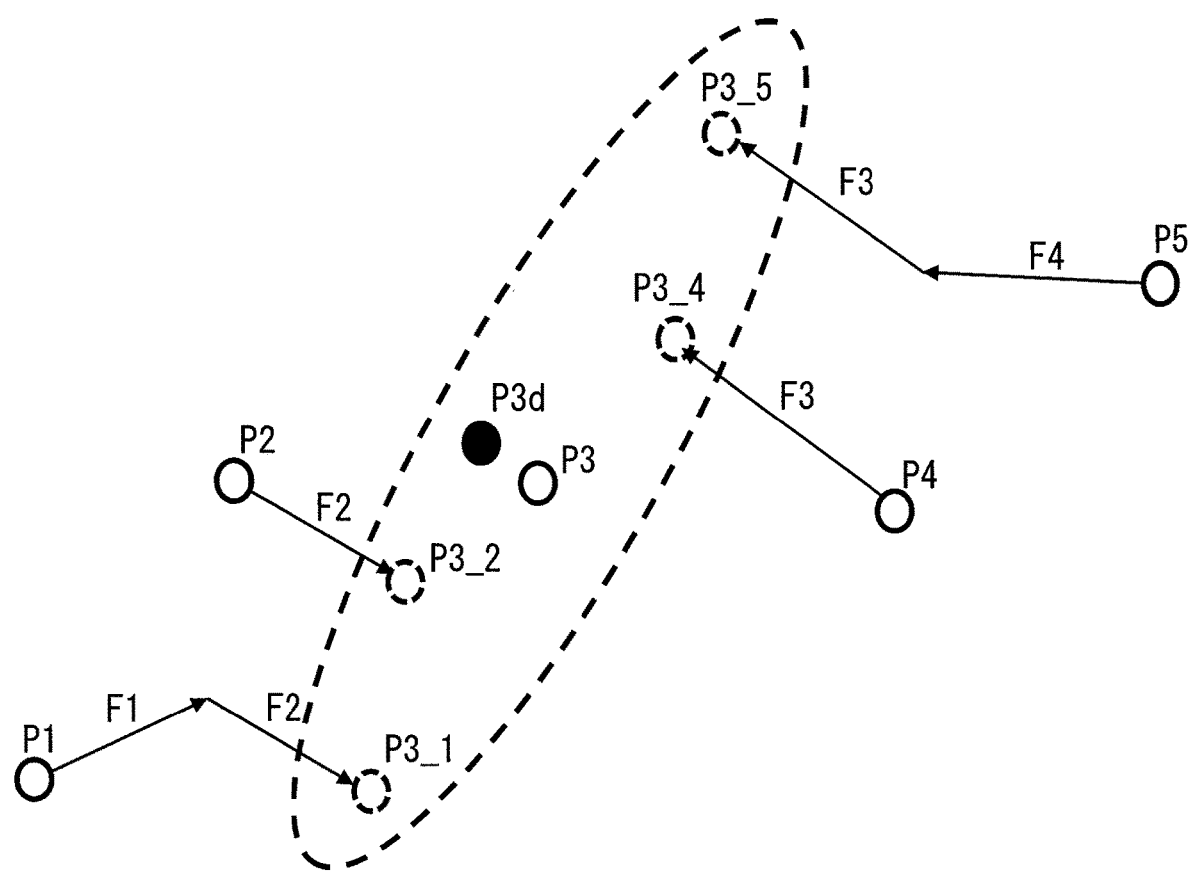
FIG. 3 is a diagram explaining an example of a method which decides a vehicle position corrected by averaging for n seconds.

The vehicle position may be corrected more accurately not only by accurately correcting the vehicle position by map matching, but also by using processing other than map matching as described with reference to FIG. 3.

Herein, an example which detects the vehicle position for each second is described. The vehicle position at t=3 seconds is decided at t=5 seconds. In FIG. 3, P1 indicates the vehicle position detected at t=1 second, P2 at t=2 seconds, P3 at t=3 seconds, P4 at t=4 seconds, and P5 at t=5 seconds. Also, P3_1 indicates the vehicle position at t=3 seconds calculated from P1, while P3_2, P3_4, and P3_5 indicate the vehicle positions at t=3 seconds calculated from P2, P4, and P5, respectively.

P3_1 is calculated by giving P1 a change corresponding to a change amount F1 of the vehicle position calculated from the speed and the yaw angle of the subject vehicle in a period from t=1 to t=2 (referred to as vehicle position change amount), and a vehicle position change amount F2 calculated in a period from t=2 to t=3. It is assumed that the vehicle position change amount is calculated from the speed of the subject vehicle calculated by the speed correction portion 107, and the yaw angle of the subject vehicle calculated by the yaw rate correction portion 108. P3_2 is calculated by giving P2 a change corresponding to the vehicle position change amount F2. P3_4 is calculated by subtracting a change corresponding to a vehicle position change amount F3 in a period from t=3 to t=4 from P4. P3_5 is calculated by subtracting a change corresponding to a vehicle position change amount F4 and the vehicle position change amount F3 in a period from time t=4 to time t=5 from P5. Thereafter, an arithmetic average value calculated from P3_1, P3_2, P3, P3_4 and P3_5 is decided as a vehicle position (P3d in FIG. 3) at t=3 seconds.

Figure 4:
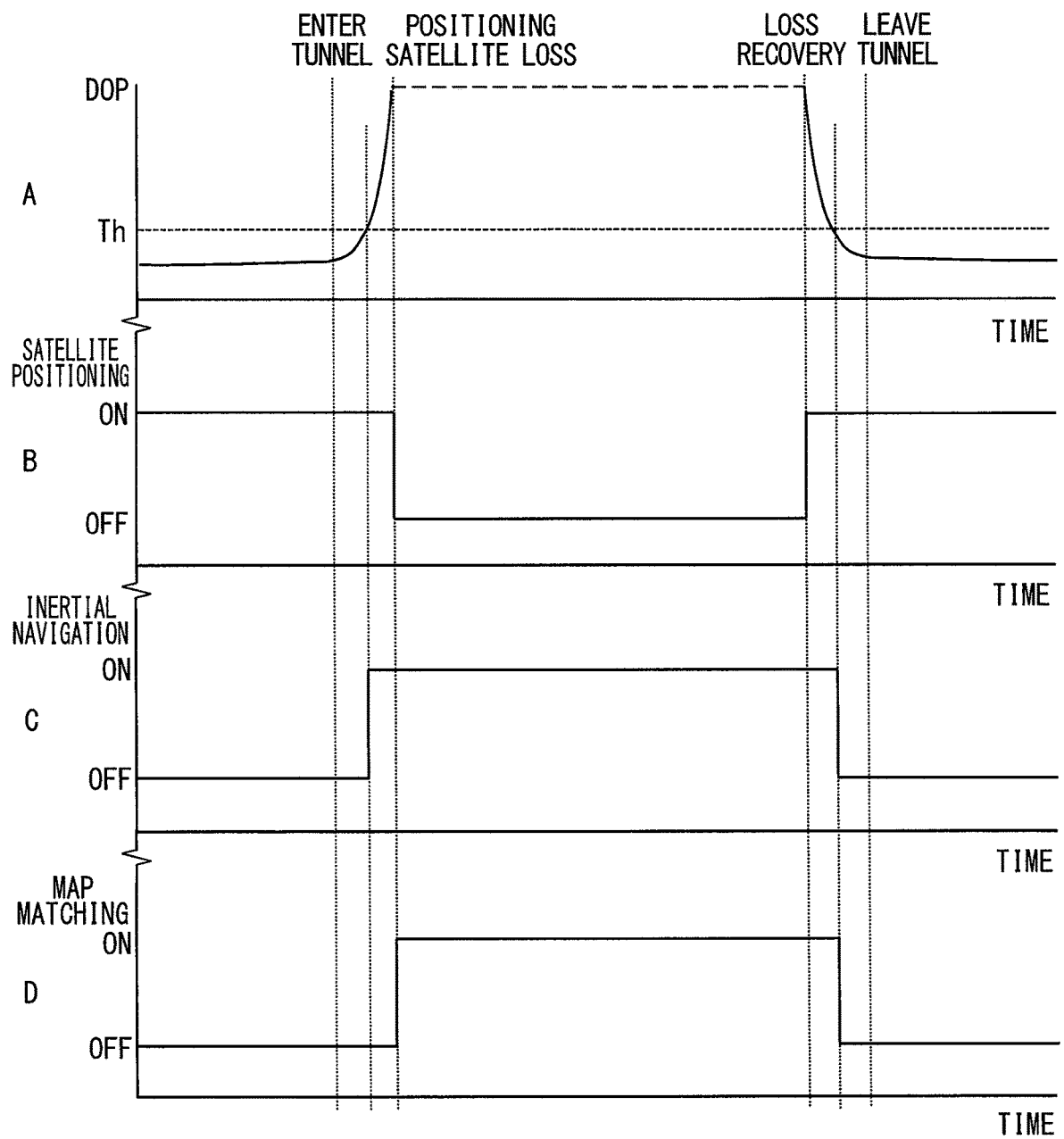
FIG. 4 is a diagram explaining a timing relationship between a change of dilution of precision (DOP), execution of satellite positioning, execution of inertial navigation, and execution of map matching.

Next, with reference to FIG. 4, a timing relationship between a change of the DOP, execution of satellite positioning, execution of inertial navigation, and execution of map matching is described. FIG. 4 shows an example case where the subject vehicle enters and leaves a tunnel. A of FIG. 4 shows a change of the DOP specified by the satellite positioning monitor 102. In the figure, a vertical axis indicates values of the DOP, while a horizontal axis indicates time. B of FIG. 4 shows switching between execution and non-execution of detection of the vehicle position by satellite positioning. In the figure, a vertical axis indicates execution (i.e., ON) or non-execution (i.e., OFF), while a horizontal axis indicates time. C of FIG. 4 shows switching between execution and non-execution of detection of the vehicle position by inertial navigation. In the figure, a vertical axis indicates execution (i.e., ON) or non-execution (i.e., OFF), while a horizontal axis indicates time. D of FIG. 4 shows switching between execution and non-execution of map matching. In the figure, a vertical axis indicates execution (i.e., ON) or non-execution (i.e., OFF), while a horizontal axis indicates time. The term "execution" herein refers to a situation periodically continued as execution.

As shown in A of FIG. 4, the value of the DOP specified by the satellite positioning monitor 102 increases approximately from a stage where the subject vehicle enters the tunnel. The increased value of the DOP decreases approximately from a stage where the subject vehicle leaves the tunnel. The example in FIG. 4 does not show values from a time when the satellite positioning monitor 102 determines a loss of positioning satellites (referred to as positioning satellite loss) to a time when a loss is no longer determined (referred to as loss recovery). As shown in B of FIG. 4, detection of the vehicle position by satellite positioning ends at a timing of a loss of positioning satellites. Thereafter, this detection restarts at a timing of a loss recovery.

As shown in C of FIG. 4, detection of the vehicle position by inertial navigation may be preferably started at a timing when the DOP becomes the first threshold Th1 or higher, which is a timing earlier than the positioning satellite loss. In addition, this detection may be preferably ended at a timing when the DOP becomes lower than the first threshold Th1, which is a timing after the lost recovery. In this manner, more accurate inertial navigation is allowed to start from a start point of the vehicle position detected by satellite positioning achieving preferable detection accuracy in a favorable situation before deterioration of detection accuracy of the vehicle position detected by satellite positioning. Moreover, deterioration of accuracy of vehicle positions stored in the position storage 106 is avoidable by continuing inertial navigation until detection accuracy of the vehicle position detected by satellite positioning becomes preferable after the loss recovery.

As shown in D of FIG. 4, map matching using map information around the subject vehicle acquired by the map information acquisition portion 109 starts at the timing of the positioning satellite loss. It may be preferable that map matching be ended after continuation of map matching until a timing when detection of the vehicle position by inertial navigation ends, which is a timing after the timing of the loss recovery. In this manner, deterioration of accuracy of vehicle positions stored in the position storage 106 is avoidable by correcting the vehicle position using map matching based on the vehicle position detected by inertial navigation until detection accuracy of the vehicle position by satellite positioning becomes preferable after the loss recovery.

The condition determination portion 111 determines whether or not a condition for issuing an emergency notification has been met (referred to as emergency notification condition). For example, the emergency notification condition may be determined to be met when an operation input indicating a state of emergency is received from the driver through an operation input portion provided on the subject vehicle. In addition, the emergency notification condition may be determined to be met when an airbag deployment signal is input from an airbag ECU of the subject vehicle.

When the condition determination portion 13 determines that the emergency notification condition has been met, the notification portion 112 issues an emergency notification to the emergency notification center 20 via the base station and the communication network. The notification portion 112 issues the emergency notification by notifying the emergency notification center 20 of information including at least the vehicle position stored in the position storage 106. The notification portion 112 may also add identification information for identifying the subject vehicle, and additional information indicating the number of occupants or the like to the emergency notification.

The vehicle position included in the emergency notification may be the latest one in the vehicle positions stored in the position storage 106. The vehicle position to be included may preferably be a set containing multiple consecutive points tracing back to the past from the latest one point (i.e., traveling locus). This configuration allows the emergency notification center 20 receiving the emergency notification to determine a traveling direction and a side road and easily and correctly guide an emergency vehicle to the subject vehicle.

When vehicle positions corrected by the correction portion 110 are stored in the position storage 106, the notification portion 112 transmits the vehicle positions corrected by the correction portion 110 to the emergency notification center 20. In other words, in a situation that map matching is started by the correction portion 110 and that the vehicle positions stored in the position storage 106 are sequentially corrected, the vehicle position corrected by the correction portion 110 is transmitted to the emergency notification center 20. The notification portion 112 and the map information acquisition portion 109 may be functional blocks each included in one member, or may be constituted by different members.

(Position Correction Related Process Performed by Emergency Notification Apparatus 10)

Figure 5:
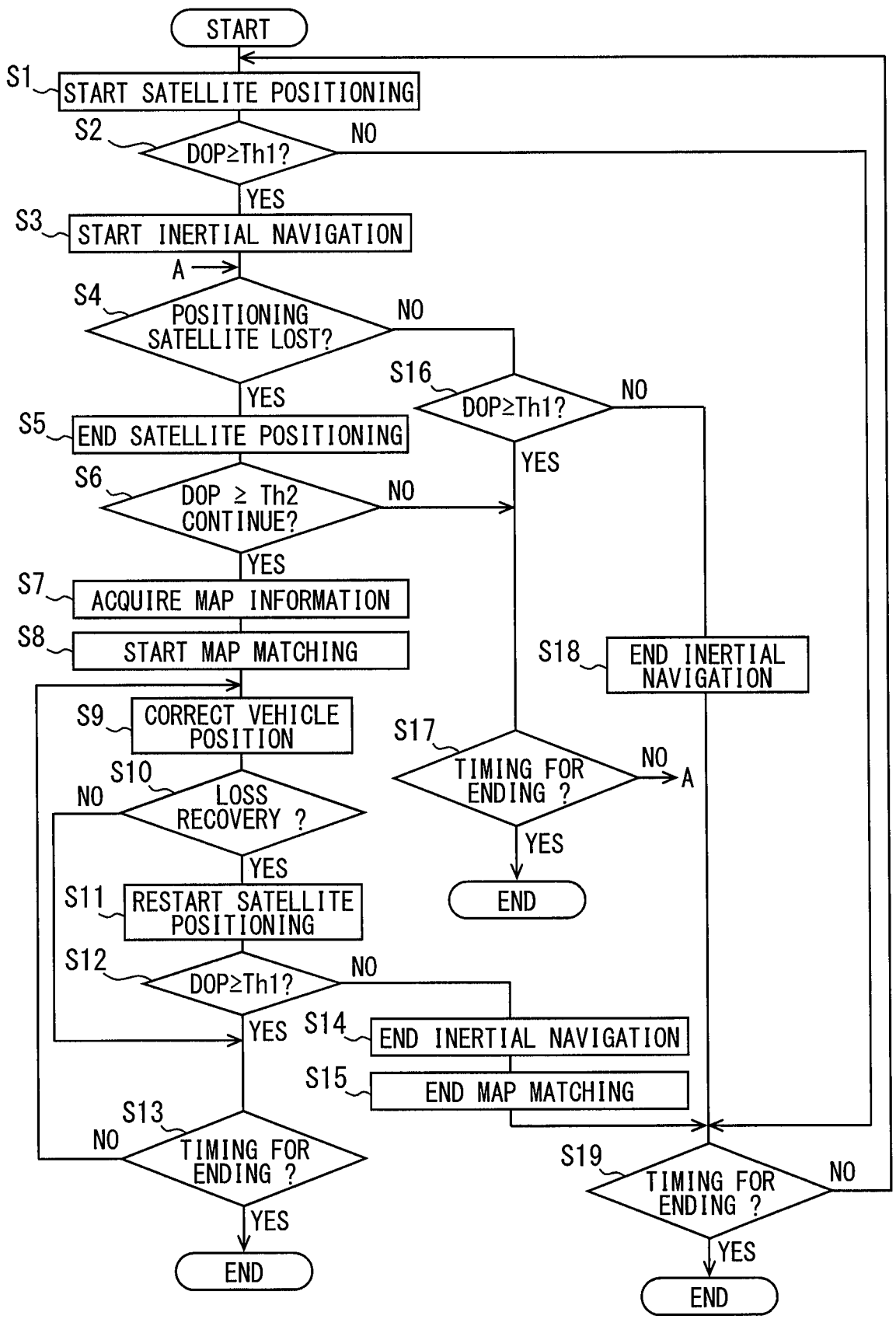
FIG. 5 is a flowchart showing an example of a flow of position correction related process performed by the emergency notification apparatus.

With reference to a flowchart in FIG. 5, an example of a flow of a process (referred to as position correction related process) related to correction of the vehicle position of the subject vehicle performed by the emergency notification apparatus 10 is described. For example, the flowchart in FIG. 5 may be configured to start when an ignition power source of the subject vehicle is turned on.

The position detector 105 starts detection of the vehicle position by satellite positioning in S1. The vehicle position sequentially detected by the position detector 105 is sequentially stored in the position storage 106. When the DOP specified by the satellite positioning monitor 102 is equal to or higher than the first threshold Th1 in S2 (YES in S2), the process proceeds to S3. On the other hand, when the DOP is lower than the first threshold Th1 (NO in S2), the process proceeds to S19.

In S3, the position detector 105 starts detection of the vehicle position by inertial navigation. When the satellite positioning monitor 102 determines a loss of positioning satellites in S4 (YES in S4), the process proceeds to S5. On the other hand, when a loss of positioning satellites is not determined (NO in S4), the process proceeds to S16. In S5, the position detector 105 ends detection of the vehicle position by satellite positioning.

When a state that the DOP specified by the satellite positioning monitor 102 is equal to or higher than the second threshold Th2 continues for the first predetermined time or longer in S6 (YES in S6), the process proceeds to S7. On the other hand, when the state that the DOP is equal to or higher than the second threshold Th2 does not reach the first predetermined time (NO in S6), the process proceeds to S17.

In S7, the map information acquisition portion 109 acquires map information around the subject vehicle from the map distribution center 30. In S8, the correction portion 110 starts map matching between the map information acquired in S7 and a set of vehicle positions indicated by multiple consecutive points (i.e., traveling locus) stored in the position storage 106. In S9, the correction portion 110 sequentially corrects the vehicle positions stored in the position storage 106 by map matching started in S8.

When the satellite positioning monitor 102 no longer determines a loss of positioning satellites, i.e., in case of recovery from a loss of positioning satellites in S10 (YES in S10), the process proceeds to S11. On the other hand, in case of no recovery from a loss of positioning satellites (NO in S10), the process proceeds to S13. In S11, the position detector 105 restarts detection of the vehicle position by satellite positioning.

When the DOP specified by the satellite positioning monitor 102 is equal to or higher than the first threshold Th1 in S12 (YES in S12), the process proceeds to S13. On the other hand, when the DOP is lower than the first threshold the first threshold Th1 (NO in S12), the process proceeds to S14. When the current time is a timing for ending the position correction related process in S13 (YES in S13), the position correction related process ends. On the other hand, when the current time is not the timing for ending the position correction related process (NO in S13), the process returns to S9 to repeat the foregoing processing. Examples of the timing for ending the position correction related process include a state that the ignition power source of the subject vehicle is turned off.

In S14 corresponding to a step performed when the DOP is lower than the first threshold Th1 in S13, the position detector 105 ends detection of the vehicle position by inertial navigation. In S15, the correction portion 110 ends map matching, and also ends correction of the vehicle positions stored in the position storage 106 by map matching. Then, the process proceeds to S19.

In step S16 corresponding to a step performed when a loss of positioning satellites is not determined in step S4, the process proceeds to step S17 when the DOP specified by the satellite positioning monitor 102 is equal to or higher than the first threshold Th1 (YES in step S16). On the other hand, when the DOP is lower than the first threshold Th1 (NO in S16), the process proceeds to S18. When the current time is a timing for ending the position correction related process in S17 (YES in S17), the position correction related process ends. On the other hand, when the current time is not the timing for ending the position correction related process (NO in S17), the process returns to S4 to repeat the foregoing processing.

In S18, the position detector 105 ends detection of the vehicle position by inertial navigation. The process proceeds to S19. When the current time is a timing for ending the position correction related process in S19 (YES in S19), the position correction related process ends. On the other hand, when the current time is not the timing for ending the position correction related process (NO in S19), the process returns to S1 to repeat the foregoing processing.

According to the configuration of the first embodiment, map matching is performed between map information acquired by the map information acquisition portion 109 and the vehicle positions detected by inertial navigation to sequentially correct the vehicle positions stored in the position storage 106 based on a state that the number of positioning satellites whose positioning signal can be received becomes smaller than the specified value. Accordingly, even in such an environment where reception of signals from positioning satellites is difficult, accuracy of the vehicle positions stored in the position storage 106 can be kept high. Even when a state of emergency is caused in the subject vehicle in the environment where reception of signals from positioning satellites is difficult, an emergency notification including the corrected vehicle position is issued. Accordingly, more accurate information indicating the position of the subject vehicle can be issued to the notification destination at the time of emergency notification. Moreover, map information used for map matching is acquired from the map distribution center 30. Accordingly, even a vehicle not including a navigation device can issue more accurate information indicating the position of the subject vehicle to the notification destination at the time of emergency notification.

Furthermore, the map information used for map matching is not acquired sequentially, but based on the state that the number of positioning satellites whose positioning signal can be received is smaller than the specified value. Accordingly, an acquisition frequency of the map information decreases, wherefore reduction of a communication volume is achievable. In addition, map information used for map matching is map information around the subject vehicle. Accordingly, a large volume of map information need not be retained in the emergency notification apparatus 10 unlike a case which acquires map information indicating other areas as well as the area around the subject vehicle. Accordingly, even a vehicle not including a navigation device can issue more accurate information indicating the position of the subject vehicle to the notification destination at the time of emergency notification while eliminating the necessity of retaining a large volume of map information in the emergency notification apparatus 10, and reducing the communication volume.

Furthermore, according to the configuration of the first embodiment, vehicle positions of the subject vehicle indicated by multiple consecutive points tracing back to the past are corrected by map matching. In this case, the vehicle position detected by satellite positioning can be corrected even when the vehicle position detected by satellite positioning, which performs low accuracy detection, is stored in the position storage 106 after a short time from determination of a loss of positioning satellites. Accordingly, even when a vehicle position detected by low-accuracy satellite positioning is stored in the position storage 106, this vehicle position can be corrected, wherefore a more accurate traveling locus can be included in the emergency notification.

Second Embodiment

According to the configuration described in the first embodiment, processing is switched to a process for storing vehicle positions detected by inertial navigation in the position storage 106 when the satellite positioning monitor 102 determines a loss of positioning satellites. Other configurations may be adopted. For example, processing may be switched to the process for storing vehicle positions detected by inertial navigation in the position storage 106 when detection of vehicle positions by inertial navigation is started based on a state that the DOP specified by the satellite positioning monitor 102 is equal to or higher than the first threshold.

Third Embodiment

According to the configuration described in the first embodiment, when the satellite positioning monitor 102 no longer determines a loss of positioning satellites after determining a loss of positioning satellites, the position detector 105 stores the vehicle position detected by inertial navigation in the position storage 106 until the DOP becomes lower than the first threshold. Other configurations may be adopted. For example, when a loss of positioning satellites is no longer determined after determining a loss of positioning satellites by the satellite positioning monitor 102, processing may be switched to a process for storing vehicle positions detected by satellite positioning in the position storage 106.

Fourth Embodiment

According to the configuration described in the first embodiment, the map information acquisition portion 109 acquires map information around the subject vehicle from the map distribution center 30 in a case where the satellite positioning monitor 102 determines a loss of positioning satellites, and in a case where the DOP specified by the satellite positioning monitor 102 is equal to or higher than the second threshold Th2 for the first predetermined time or longer. Other configurations may be adopted. For example, a configuration (referred to as fourth embodiment) may be adopted in which the map information acquisition portion 109 acquires map information around the subject vehicle from the map distribution center 30 in a case where the satellite positioning monitor 102 determines a loss of positioning satellites, and in a case where the speed of the subject vehicle (i.e., vehicle speed) is kept equal to or higher than a predetermined speed for a second predetermined time or longer. The predetermined speed and the second predetermined time referred to herein may be any values as long as distinction between traveling in such a region where the presence position of the subject vehicle may extend through a wide range, such as a tunnel, and traveling in such a region where the presence position of the subject vehicle is limited to a relatively narrow range, such as an underground parking lot, can be made based on these values. For example, the predetermined speed may be 30 km/h, while the second predetermined time may be 20 seconds.

When the vehicle enters an area where the presence position of the subject vehicle is limited to a relatively narrow range, such as an underground parking lot, the degree of necessity of correcting the vehicle position by map matching is small in consideration of limitation of the presence position of the subject vehicle to a relatively narrow range. According to the configuration of the fourth embodiment, a useless process for acquiring map information can be omitted when the degree of necessity of correction of the vehicle position by map matching is small, in such a case that the vehicle enters an area where the presence position of the subject vehicle is limited to a relatively narrow range.

When adopting the fourth embodiment, following processing may be performed instead of the processing of S6 in the first embodiment. More specifically, the process proceeds to S7 when the speed of the subject vehicle is equal to or higher than the predetermined vehicle speed and continues for the second predetermined time or longer. On the other hand, the process proceeds to S17 when the speed of the vehicle is equal to or higher than the predetermined vehicle speed but does not continue for the second predetermined time or longer. In addition, following processing may be performed between the processing in S5 and the processing in S6 of the first embodiment. More specifically, the process proceeds to S6 when the speed of the subject vehicle is equal to or higher than the predetermined vehicle speed and continues for the second predetermined time or longer. On the other hand, the process proceeds to S17 when the speed of the subject vehicle is equal to or higher than the predetermined vehicle speed but does not continue for the second predetermined time or longer.

Fifth Embodiment

In such a case where vehicle positions detected by inertial navigation at the position detector 105 have been out of a range of previously acquired map information, the map information acquisition portion 109 preferably again acquires map information around the subject vehicle from the map distribution center 30.

Sixth Embodiment

When it is expected that vehicle positions detected by the position detector 105 using inertial navigation will be out of a range of previously acquired map information, the map information acquisition portion 109 may be configured to again acquire map information around the subject vehicle from the map distribution center 30. Whether or not vehicle positions detected by the position detector 105 using inertial navigation will be out of the range of the previously acquired map information may be determined by estimating subsequent vehicle positions of the subject vehicle based on a past traveling locus of the subject vehicle, for example.

Seventh Embodiment

According to the configuration described in the first embodiment, the speed correction portion 107 learns a tire radius correction coefficient, and the yaw rate correction portion 108 learns an offset. Other configurations may be adopted. Learning of the tire radius correction coefficient and the offset may be omitted.

Eighth Embodiment

According to the configuration described in the first embodiment, the vehicle positions of the subject vehicle indicated by multiple sequential points tracing back to the past before a start of map matching are corrected. Other configurations may be adopted. For example, correction of the vehicle position detected before a start of map matching may be omitted.

Ninth Embodiment

According to the configuration described in the first embodiment, vehicle positions of the subject vehicle are detected by inertial navigation based on the wheel speed detected by the wheel speed sensor provided on the subject vehicle, and the yaw rate detected by the gyro sensor provided on the subject vehicle. Other configurations may be adopted. For example, a vehicle speed detected by a vehicle speed sensor which detects the vehicle speed of the subject vehicle may be employed instead of the wheel speed detected by the wheel speed sensor. Alternatively, vehicle positions of the subject vehicle may be detected by inertial navigation based on acceleration detected by an acceleration sensor provided on the emergency notification apparatus 10, and the yaw rate detected by the gyro sensor provided on the emergency notification apparatus 10.

It is noted that a flowchart or the processing of the flowchart in the present application includes multiple steps (also referred to as sections), each of which is represented, for instance, as S1. Further, each step can be divided into several sub-steps while several steps can be combined into a single step.

Controllers and methods described in the present disclosure may be implemented by a special purpose computer created by configuring a memory and a processor programmed to execute one or more particular functions embodied in computer programs. Alternatively, the control units, the controllers and the methods described in the present disclosure may be implemented by a special purpose computer created by configuring a processor provided by one or more special purpose hardware logic circuits. Further alternatively, the control units, the controllers and the methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While various embodiments, configurations, and aspects of emergency notification apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An emergency notification apparatus used in a vehicle, the emergency notification apparatus comprising:
    a position detector that sequentially detects a position of a subject vehicle, wherein the position detector is configured to detect the position of the subject vehicle based on a positioning signal received from a positioning satellite and detect the position of the subject vehicle by inertial navigation;
    a notification portion that issues an emergency notification when a state of emergency is caused in the subject vehicle;
    a map information acquisition portion that acquires map information around the subject vehicle from an outside of the subject vehicle in response to a total number of positioning satellites whose positioning signal is received being smaller than a specified value; and
    a correction portion that sequentially corrects the position of the subject vehicle by sequentially performing map matching between a road indicated by the map information acquired by the map information acquisition portion and the position of the subject vehicle detected by the inertial navigation in response to the number of the positioning satellites whose positioning signal is received being smaller than the specified value,
    wherein:
    the notification portion issues the emergency notification that includes the position of the subject vehicle corrected by the correction portion in a case where (i) the state of emergency of the subject vehicle has been caused in the subject vehicle, and (ii) the correction portion sequentially corrects the position of the subject vehicle.

2. The emergency notification apparatus according to claim 1, wherein:
    the correction portion sequentially performs map matching between the road indicated by the map information acquired by the map information acquisition portion and the position of the subject vehicle detected by the inertial navigation in response to the number of the positioning satellites whose positioning signal is received being smaller than the specified value to sequentially correct positions of the subject vehicle indicated by a plurality of consecutive points tracing back to a past; and
    the notification portion issues the emergency notification that includes the positions of the subject vehicle indicated by the plurality of consecutive points corrected by the correction portion in a case where the state of emergency has been caused in the subject vehicle, and the correction portion sequentially corrects the positions of the subject vehicle.

3. The emergency notification apparatus according to claim 2, wherein:
    the correction portion also corrects the position of the subject vehicle detected based on the positioning signals by performing the map matching in a case where the positions of the subject vehicle indicated by the plurality of consecutive points tracing back to the past are sequentially corrected, and the position of the subject vehicle detected based on the positioning signal is included in the plurality of consecutive points tracing back to the past.

4. The emergency notification apparatus according to claim 1, further comprising:
    a deterioration specifying portion that sequentially specifies deterioration of detection accuracy of the position of the subject vehicle based on the positioning signal,
    wherein:
    the position detector starts detection of the position of the subject vehicle by the inertial navigation in a case where the deterioration specified by the deterioration specifying portion is equal to or higher than a first threshold before the number of the positioning satellites whose positioning signal is received becomes smaller than the specified value.

5. The emergency notification apparatus according to claim 4, wherein:
   the position detector continues the detection of the position of the subject vehicle by the inertial navigation until the deterioration specified by the deterioration specifying portion becomes lower than the first threshold even after returning to a state that the number of the positioning satellites whose positioning signal is received becomes the specified value or greater;
   the position detector ends the detection of the position of the subject vehicle by the inertial navigation in a case where the deterioration becomes lower than the first threshold; and
   the correction portion continues the map matching between the road indicated by the map information acquired by the map information acquisition portion and the position of the subject vehicle detected by the inertial navigation to sequentially correct the position of the subject vehicle during continuation of detection of the position of the subject vehicle by the inertial navigation.

6. The emergency notification apparatus according to claim 1, further comprising:
   a deterioration specifying portion that sequentially specifies deterioration of detection accuracy of the position of the subject vehicle based on the positioning signal, wherein:
   the map information acquisition portion acquires the map information around the subject vehicle from the outside of the subject vehicle in a case where the number of the positioning satellites whose positioning signal is received being smaller than the specified value, and the deterioration specified by the deterioration specifying portion is kept equal to or higher than a second threshold for a first predetermined time or longer.

7. The emergency notification apparatus according to claim 1, wherein:
   the map information acquisition portion acquires the map information around the subject vehicle from the outside of the subject vehicle in a case where the number of the positioning satellites whose positioning signal is received being smaller than the specified value, and a speed of the subject vehicle is kept equal to or higher than a predetermined speed for a second predetermined time or longer.

8. The emergency notification apparatus according to claim 1, wherein:
   the map information acquisition portion acquires the map information around the subject vehicle from the outside of the subject vehicle in a case where the position of the subject vehicle detected by the inertial navigation has been out of a range of the map information previously acquired.

9. The emergency notification apparatus according to claim 1, wherein:
   the map information acquisition portion acquires the map information around the subject vehicle from the outside of the subject vehicle in a case where the position of the subject vehicle detected by the inertial navigation becomes out of a range of the map information previously acquired.

10. The emergency notification apparatus according to claim 1, further comprising:
    a deterioration specifying portion that sequentially specifies deterioration of detection accuracy of the position of the subject vehicle,
    wherein:
    the deterioration specifying portion determines based on the deterioration of the detection accuracy, whether the total number of positioning satellites whose positioning signal is received is smaller than the specified number.

\* \* \* \* \*